(12) United States Patent
Lin

(10) Patent No.: US 7,726,862 B2
(45) Date of Patent: Jun. 1, 2010

(54) INDICATOR LIGHT USING LIGHT GUIDING UNIT

(75) Inventor: Shih-Po Lin, Taipei County (TW)

(73) Assignee: Chi Mei Communication Systems, Inc., Tu-Cheng, Taipei County (TW)

( * ) Notice: Subject to any disclaimer, the term of this patent is extended or adjusted under 35 U.S.C. 154(b) by 0 days.

(21) Appl. No.: 12/345,380

(22) Filed: Dec. 29, 2008

(65) Prior Publication Data

US 2010/0027286 A1 Feb. 4, 2010

(30) Foreign Application Priority Data

Jul. 30, 2008 (CN) .................... 2008 1 0303198

(51) Int. Cl.
*F21V 8/00* (2006.01)
(52) U.S. Cl. ........................ 362/555; 362/800; 362/30; 362/26; 362/612

(58) Field of Classification Search ............. None
See application file for complete search history.

(56) References Cited

U.S. PATENT DOCUMENTS

| 4,079,242 | A  | * | 3/1978 | Seibel | 362/577 |
|-----------|----|---|--------|--------|---------|
| 5,555,161 | A  | * | 9/1996 | Roe et al. | 362/555 |
| 6,874,921 | B2 | * | 4/2005 | Verlage et al. | 362/487 |
| 7,195,387 | B2 | * | 3/2007 | Gruhlke et al. | 362/555 |
| 2006/0092619 | A1 | * | 5/2006 | Hsu et al. | 362/26 |

* cited by examiner

*Primary Examiner*—Laura Tso
(74) *Attorney, Agent, or Firm*—D. Austin Bonderer

(57) ABSTRACT

An annular light guiding unit for portable electronic device comprises a first surface, a second surface located opposite to the first surface, and a wall connecting the first surface and the second surface together. The wall is defined a plurality of first wedged walls therein.

15 Claims, 3 Drawing Sheets

INDICATOR LIGHT USING LIGHT GUIDING UNIT

BACKGROUND

1. Field of the Invention

The exemplary embodiment relates to light guiding units and, particularly to a light guiding unit for an indicator light of a portable electronic device.

2. Description of Related Art

Light guiding units are widely used in portable electronic devices such as mobile phones. Light guiding units are typically used to guide light to illuminate objects such as keys of the mobile phone.

The mobile phone often includes an indicator light for indicating a status such as an incoming call. A light guiding unit guides light emitted from light sources (e.g., LEDs). Thus, the light guiding unit can guide light to the indicator light to display an incoming call signal.

However, non-illuminated areas can exist when light sources are distant from the light guiding unit. As such, an indicator light may need many light sources to enlarge the illuminating scope of the light guiding unit.

Therefore, there is room for improvement within the art.

BRIEF DESCRIPTION OF THE DRAWINGS

Many aspects of the exemplary indicator light using the light guiding unit can be better understood with reference to the following drawings. These drawings are not necessarily drawn to scale, the emphasis instead being placed upon clearly illustrating the principles of the exemplary indicator light. Moreover, in the drawings like reference numerals designate corresponding parts throughout the several views. Wherever possible, the same reference numbers are used throughout the drawings to refer to the same or like elements of an embodiment.

DETAILED DESCRIPTION OF THE EMBODIMENTS

Figure 1:
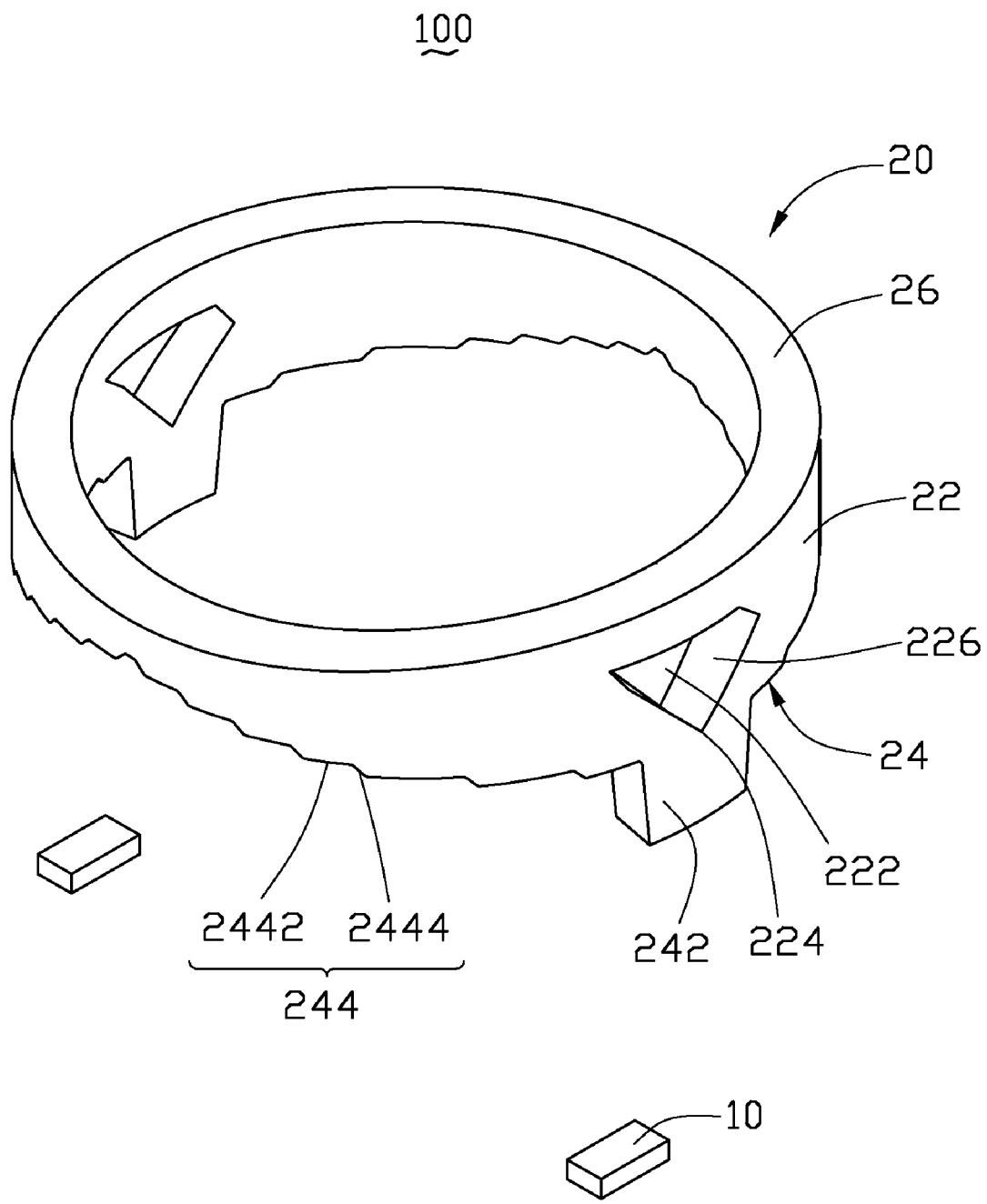
FIG. 1 is a schematic and exploded view of an indicator light using a light guiding unit according to an exemplary embodiment, showing one aspect.
Figure 2:
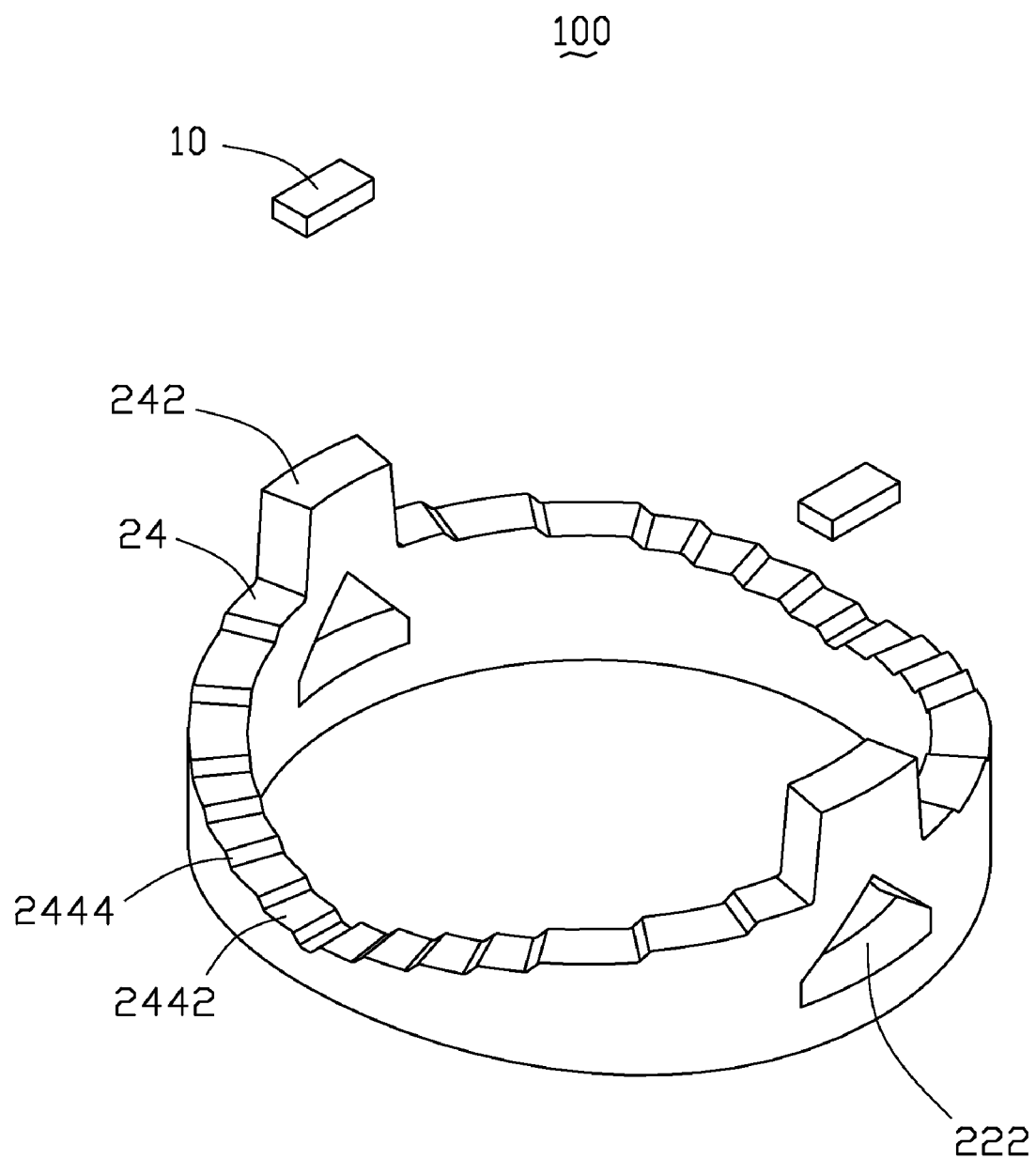
FIG. 2 is a schematic and exploded view of the indicator light in FIG. 1, showing another aspect.

FIG. 1 shows an indicator light 100 including two light sources 10 and a light guiding unit 20. The light sources 10 are mounted to the light guiding unit 20 for illuminating the light guiding unit 20. The light sources 10 may be light emitting diodes (LEDs) electrically connected to a circuit board (not shown) of a portable electronic device.

The light guiding unit 20 may be substantially annular and including a wall 22, a first surface 24 facing the light sources 10, and a second surface 26 opposite to the first surface 24.

Figure 3:
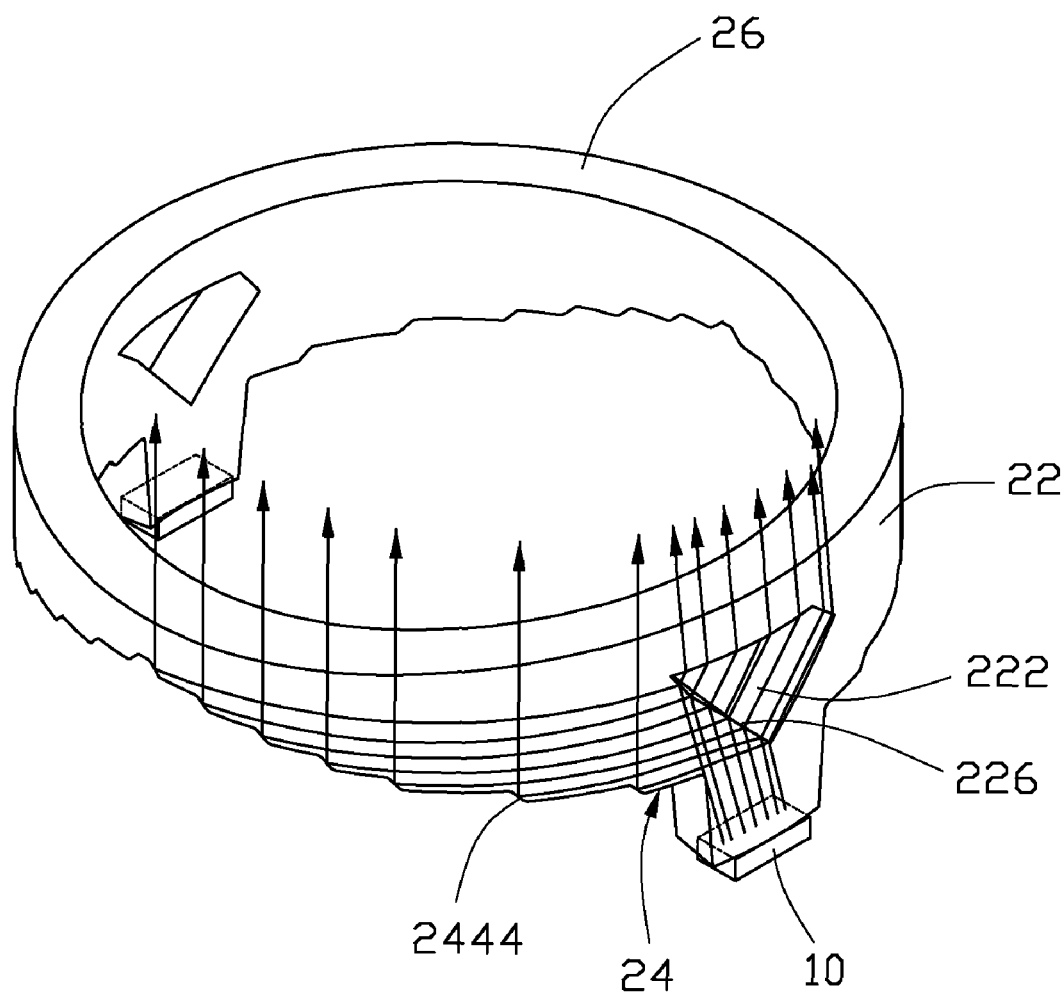
FIG. 3 is a schematic and assembled view of the indicator light in FIG. 1, and showing the light guided by the light guiding unit.

The wall 22 has two oppositely positioned and substantially triangular notches 222 defined therethrough. Each notch 222 has an apex angle section 224 pointing away and spaced from the second surface 26 and two first wedged walls 226 connected to the apex angle section 224. Referring to FIG. 3, the first wedged walls 226 reflect the light emitted from the light sources 10 in a direction parallel with the first surface 24.

The first surface 24 forms two blocks 242 corresponding to the notches 222. The light sources 10 are attached to the blocks 242 facing the apex angle sections 224. The blocks 242 are configured to guide the light emitted from the light sources 10 towards the wall 22. The first surface 24 defines step portions 244 between the two blocks 242. Each step portion 244 includes a plurality of steps 2442 generally parallel with the second surface 26, and a plurality of second wedged walls 2444 connecting adjacent steps 2442. Each step portion 244 is substantially V-shaped, and the steps 2442 from opposite ends of the step portion 244 gradually become closer to the second surface 26 towards the middle of the step portion 244. The second wedged walls 2444 are configured for reflecting the light guided by the first wedged walls 226, towards the second surface 26.

Referring to FIG. 3, in use, the light from the light sources 10 may be guided to strike the wall 22 by the blocks 242. During this stage, when the light travels towards the first wedged walls 226, the first wedged walls 226 act as an interface between the light guiding unit 20 and the air in the notches 222, thus the light is partially reflected by the first wedged walls 226 and is partially refracted by the first wedged walls 226. The travel path of the reflected light is parallel with the first surface 24 to shine on the second wedged walls 2444. After that, the reflected light is reflected again by the second wedged walls 2444 towards the second surface 26. The refracted light travels into the notches 222, and then through the second surface 26. Therefore, the illuminating scope of the light from the light sources 10 may be enlarged by the above-described light guiding of the first wedged walls 226 and the second wedged walls 2444.

It is to be understood, however, that even through numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A light guiding unit for a portable electronic device, comprising:
   a first surface;
   a second surface located opposite to the first surface; and
   a wall connecting the first surface and the second surface together, the wall defining a plurality of first wedged walls; and
   a plurality of blocks corresponding to the first wedged walls.

2. The light guiding unit as claimed in claim 1, wherein the wall has two triangular notches defined therein, the first wedged walls are defined in the notches.

3. The light guiding unit as claimed in claim 2, wherein each notch has an apex angle section facing the first surface.

4. The light guiding unit as claimed in claim 1, wherein the light guided by the blocks is partially reflected by the first wedged walls and partially refracted by the first wedged walls.

5. The light guiding unit as claimed in claim 4, wherein the reflected light is substantially parallel with the first surface.

6. The light guiding unit as claimed in claim 4, wherein the first surface defines step portions between the two blocks, each step portion includes a number of steps parallel with the second surface and a plurality of second wedged walls for connecting adjacent steps.

7. The light guiding unit as claimed in claim 6, wherein each step portion is substantially V-shaped, and the distance between the steps and the second surface decreases towards the center of the step portion.

8. An indicator light of a portable electronic device, comprising:

a plurality of light sources; and a annular light guiding unit including a first surface, a second surface located opposite to the first surface, and a wall connecting the first surface and the second surface together, the wall defines a plurality of first wedged walls the light sources attached to the first surface of the light guiding unit.

9. The indicator light as claimed in claim 8, wherein the wall has two triangular notches defined therein, the first wedged walls are defined by the notches.

10. The indicator light as claimed in claim 9, wherein each notch has an apex angle section facing the first surface.

11. The indicator light as claimed in claim 8, wherein the light guiding unit has a plurality of blocks corresponding to the first wedged walls, the light sources attached to the blocks.

12. The indicator light as claimed in claim 11, wherein the light guided by the blocks is partially reflected by the first wedged walls and partially refracted by the first wedged walls.

13. The indicator light as claimed in claim 12, wherein the reflected light is substantially parallel with the first surface.

14. The indicator light as claimed in claim 12, wherein the first surface defines two step portions between the two blocks, each step portion includes a number of steps parallel with the second surface and a plurality of second wedged walls for connecting the adjacent steps.

15. The light guiding unit as claimed in claim 14, wherein each step portion is substantially V-shaped, and the distance between the steps and the second surface decreases towards the center of the step portion.

\* \* \* \* \*